UNITED STATES PATENT OFFICE.

PERCY HUTCHINS CARTER, OF SAVANNAH, GEORGIA.

PROCESS OF PRODUCING FERTILIZER MATERIALS AND THE PRODUCTS OBTAINED THEREFROM.

1,293,029. Specification of Letters Patent. Patented Feb. 4, 1919.

No Drawing. Application filed March 23, 1917, Serial No. 156,935. Renewed November 20, 1918. Serial No. 263,441.

*To all whom it may concern:*

Be it known that I, PERCY H. CARTER, a citizen of the United States, residing at Savannah, in the county of Chatham and State of Georgia, have invented certain new and useful Improvements in Processes of Producing Fertilizer Materials and the Products Obtained Therefrom, of which the following is a specification.

This invention relates to a process of producing fertilizer material from "fertilizer stick" and to the treatment of cyanamid to obtain therefrom a material intended primarily for use in such process but adopted for other uses.

The invention also consists in the products of such processes.

As is well known in the fertilizer art, cyanamid is valuable as a source of ammonia, and attempts have been made to use it in connection with fertilizers or their constituents. Thus it has been proposed to add cyanamid to acid phosphate rock or compounds containing available phosphoric acid. It was found, however, that the cyanamid will cause the available phosphoric acid to revert to the unavailable form. It has been stated that this action of cyanamid will be overcome if not over 80 pounds of cyanamid is added to a ton of fertilizer material containing available phosphoric acid. It is thus apparent that the proportion of cyanamid which can be employed in connection with phosphates in fertilizer materials is so small as to militate against its use in fertilizer manufacture.

In accordance with my invention, the cyanamid is so treated that it may be added to fertilizer material containing available phosphoric acid, such as calcium acid phosphate, or other fertilizer material, and particularly to "fertilizer stick," in any desired proportions, and far in excess of 80 pounds of cyanamid to one ton of the fertilizer material without producing the injurious effect referred to.

Cyanamid as now produced and used is a caustic product whose use is very objectionable to workmen, in that it injuriously effects the skin, causing eruptions. In my process, this objection is also effectually overcome.

In accordance with my process, I grind or otherwise finely divide niter cake and mix the same with cyanamid. The niter cake having acid properties, its acidity neutralizes the caustic properties of the cyanamid.

As to the proportions of niter cake which are to be added to the cyanamid, I have found that the same may be widely varied depending upon the acidity of the niter cake and the alkalinity of the cyanamid. Preferably a sufficient amount of the ground niter cake should be added to the cyanamid to neutralize or substantially neutralize the latter, it being understood however that it is not necessary that the cyanamid be wholly or completely neutralized, as some degree of success may be obtained by employing the product either somewhat acid or somewhat alkaline.

In cases where it is desired to further increase the ammonia content in a fertilizer, the acidity of the niter cake may be increased by the addition thereto of an acid, such as sulfuric acid. It will be apparent that where acid is added a larger proportion of cyanamid would have to be added to the acid niter cake to produce a product which is neutral or substantially neutral.

The product thus obtained may be added to acid phosphate rock or other fertilizer material without causing the available phosphoric acid to revert to the unavailable form.

As is well known in the art, "fertilizer stick" obtained from slaughter houses, garbage plants, fish factories, and the like, possesses marked advantages as a fertilizer or fertilizer constituent. The material is, however, normally semi-liquid, viscous, and deliquescent, and this prevents its use without further treatment as a fertilizer constituent. Great difficulty has heretofore been experienced in converting this semi-liquid material into solid stable form.

Now, I have discovered that if the product that results from the treatment of the cyanamid with niter cake and which contains calcium and sodium sulfates, be added to the "stick" the product will, by chemical combination with the water present, transform the "stick" into a solid stable substance.

Cyanamid alone, or without prior treatment with the niter cake, cannot be added to the "stick" without the loss of ammonia and this loss of ammonia takes place from both the cyanamid and the "stick." When the cyanamid treated in accordance with my process is added to the "stick," ammonia is not lost from either the cyanamid or the "stick."

It is to be understood that the use of the product which results from treating the cyanamid with the niter cake is not necessarily restricted to the treatment of the "stick" in accordance with my process, but may be advantageously used in connection with acid phosphate or any other suitable fertilizer material.

While I have described in detail the preferred practice of my process, and proportions of ingredients employed therein, it is to be understood that such process is not limited to the exact details of procedure set forth, nor to the proportion of ingredients recited, but that these may be widely varied without departing from the spirit of my invention or the scope of the subjoined claims.

Having thus described my invention, I claim:

1. The herein described process of producing a fertilizer material, which consists in subjecting cyanamid to the action of niter cake, subjecting "fertilizer stick" to the action of the product thus obtained and allowing the mass to dry and harden.

2. The herein described process of producing a fertilizer material, which consists in mixing cyanamid and pulverized niter cake in such proportions as to produce a substantially neutral product, subjecting "fertilizer stick" to the action of the product thus obtained, and allowing the mass to harden.

3. The herein described product comprising cyanamid niter cake, and "fertilizer stick" in substantially dry form.

In testimony whereof I affix my signature in presence of two witnesses.

PERCY HUTCHINS CARTER.

Witnesses:
NELLIE A. LLOYD,
J. READ SWEAT.